United States Patent [19]

Oberster et al.

[11] Patent Number: 4,987,192

[45] Date of Patent: Jan. 22, 1991

[54] COLORED TIRE STOCKS HAVING IMPROVED ABRASION RESISTANCE, COLOR AND COLOR STABILITY

[76] Inventors: Arthur E. Oberster, 6021 Hollydale Ave., NE., North Canton, Ohio 44721; Charles M. Roland, 324 Eutaw Forest Dr., Waldorf, Md. 20601; Georg G. A. Bohm, 1212 Sunset View Dr., Akron, Ohio 44313

[21] Appl. No.: 353,945

[22] Filed: May 19, 1989

[51] Int. Cl.$^5$ .......................... C08K 3/22; C08K 5/09; C08L 7/00; C08L 11/00
[52] U.S. Cl. ................................. 525/274; 525/193; 525/196; 525/368
[58] Field of Search ............... 525/211, 236, 237, 174, 525/193, 196, 368

[56] References Cited

U.S. PATENT DOCUMENTS 4,804,028 2/1989 Botzman ........................... 525/211

FOREIGN PATENT DOCUMENTS 1091818 11/1967 United Kingdom .

Primary Examiner—Allan M. Lieberman

[57] ABSTRACT

Colored tire stocks having improved abrasion resistance, color and color stability as compared to conventional colored tire stocks such as white sidewall stocks are provided. The colored tire stocks of the invention comprise crosslinked colored rubber compositions containing from 10 to 90% of ionic crosslinks and from 90 to 10% of free radical induced covalent crosslinks. These colored tire stocks may be utilized as functional tire stocks such as colored sidewall stocks (e.g. white sidewalls) or as decorative tire stocks such as raised colored letters (e.g. raised white letters) which identify the tire manufacturer.

19 Claims, No Drawings

COLORED TIRE STOCKS HAVING IMPROVED ABRASION RESISTANCE, COLOR AND COLOR STABILITY

BACKGROUND OF THE INVENTION

The invention relates to colored tire stocks. More particularly, the invention relates to colored tire stocks having improved abrasion resistance, color and color stability.

Conventional colored tire stocks such as white sidewall tire stocks are generally composed of a blend of rubbers, typically a blend of natural rubber, chlorobutyl rubber or SBR and EPDM rubber; a color pigment such as $TiO_2$; non-black fillers such as clay and a sulfur-based curing system along with antioxidants, antiozonants, waxes and the like. However such conventional colored tire stocks upon exposure to sunlight and the atmosphere tend to discolor and lose their attractive appearance. Thus, for example, when conventional white sidewall stocks are exposed to sunlight and the atmosphere they tend to yellow rather readily. Moreover, tires are subject to accidental curb scuffing which often abrades the surface of colored tire stocks such as colored sidewalls or raised colored letters and further diminishes the attractiveness thereof. Accordingly, colored tire stocks having improved abrasion resistance, color and color stability are highly desired.

SUMMARY OF THE INVENTION

In accordance with the present invention, colored tire stocks having improved abrasion resistance, color and color stability are provided. These colored tire stocks comprise crosslinked colored rubber compositions containing from 10 to 90% of ionic crosslinks and from 90 to 10% of free radical induced covalent cross inks.

The colored rubber composition prior to crosslinking or curing comprises a rubber which is capable of undergoing ionic and covalent crosslinking; an ionic crosslinking agent selected from the group consisting of metal salts of carboxylic acids and inorganic metal salts and a free radical generating covalent crosslinking agent. Alternatively, the colored rubber composition prior to completion of crosslinking may comprise a neutralized acid-group containing rubber and a free radical generating covalent crosslinking agent.

As compared to a conventional tire stock, the colored tire stocks of the invention exhibit improved color in that they have a brighter (e.g. whiter) appearance and improved color stability in that they have less tendency to yellow or discolor upon exposure to sunlight or ultraviolet light. Moreover, these colored tire stocks show much improved abrasion resistance as indicated by both laboratory tests and tires subjected to curb scuffing.

DETAILED DESCRIPTION OF THE INVENTION

The term "colored" as used in connection with the term "colored tire stocks" throughout the specification and claims herein refers to and is limited to non-black colored tire stocks such as white, green, red, yellow, blue, brown, etc. tire stocks. The term "neutralized" as used throughout the specification and claims is intended to cover either complete or partial neutralization of acid groups.

The colored tire stocks of the invention comprise crosslinked colored rubber compositions containing from 10 to 90% of ionic crosslinks and from 90 to 10% of free radical induced covalent crosslinks.

As indicated above, the colored rubber composition in one embodiment prior to crosslinking contains a rubber which is capable of undergoing ionic and covalent crosslinking or in other words, a rubber which can be ionically and covalently crosslinked. Suitable rubbers of this type which may be utilized include saturated rubbers, unsaturated rubbers, acid group-containing rubbers and blends thereof.

Saturated rubbers which may be employed include hydrogenated rubbers such as hydrogenated styrene-butadiene rubbers, hydrogenated polybutadiene rubbers and the like; butyl rubber and halogenated butyl rubbers such as chlorobutyl rubber, bromobutyl rubber and the like. Such saturated rubbers and methods for their preparation are well known in the polymer and rubber arts. Thus, the hydrogenated styrene-butadiene and polybutadiene rubbers may be prepared by polymerizing the styrene and butadiene or butadiene monomers in solution using an alkyl lithium catalyst, preferably butyl lithium, and then hydrogenating the resultant polymers in well known manner using an appropriate hydrogenation catalyst such as, for example, a Raney nickel or nickel kieselguhr catalyst. Butyl rubber can be prepared by polymerizing an isoolefin such as isobutylene and a conjugated diene such as isoprene in the presence of a metal halide catalyst such as aluminum chloride. Chlorinated butyl rubber can be prepared by chlorinating butyl rubber using elemental chlorine in a hexane solution of butyl rubber using the procedure described in U.S. Pat. No. 2,944,578, the disclosure of which is incorporated herein by reference. A typical chlorobutyl rubber is one having a chlorine content of from 1.1 to 1.3 percent and a viscosity, $ML/(1+8)/100°$ C., of from 51 to 60 available under the designation Exxon 1066 from Exxon Chemical Company.

Unsaturated rubbers which may be employed include natural rubber, styrene-butadiene rubber (SBR), polybutadiene rubber, EPDM and blends thereof. Such rubbers and their method of preparation are well known in the art.

The term "EPDM" as used throughout the specification is used in the sense of its definition as found in ASTM-D-1418-64 and is intended to mean a terpolymer of ethylene, propylene and a diene monomer. Illustrative methods for preparing such terpolymers are found in U.S. Pat. No. 3,280,082 and British Pat. No. 1,030,289, the disclosures of which are incorporated herein by reference. The preferred terpolymers contain from about 40 to 80 weight percent ethylene and from about 1 to about 10 weight percent of the diene with the balance of the terpolymer being propylene.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like.

Acid-group containing rubbers which may be employed include carboxylated rubbers and sulfonated rubbers. Suitable carboxylated rubbers include carboxylated styrene-butadiene rubber, carboxylated polybutadiene rubber, and carboxylated nitrile rubber. Suitable sulfonated rubbers include sulfonated styrene-butadiene rubber and sulfonated EPDM rubber. Such acid-group containing rubbers and their method of preparation are well known in the art. Thus, for example, a carboxylated styrene-butadiene rubber or carboxylated nitrile rubber can be prepared by copolymerizing butadiene and styrene or butadiene and acrylonitrile with an unsaturated acid such a methacrylic acid in an acid medium. Alternatively, the carboxylated rubber may be prepared by copolymerizing butadiene and styrene or butadiene and acrylonitrile with an acrylate or methacrylate ester such as an alkyl acrylate or alkyl methacrylate and then hydrolyzing the acrylate or methacrylate ester to the acid by heating in alkaline solution. Sulfonated rubbers such as sulfonated EPDM or sulfonated SBR can be prepared by sulfonating the EPDM or SBR using a sulfonating agent selected from a complex of a sulfur trioxide donor and a Lewis base, acetyl sulfate, propionyl sulfate and butyryl sulfate using the procedure described in U.S. Pat. Nos. 3,642,728 and 3,836,511, the disclosures of which are incorporated herein by reference.

As also indicated heretofore, the colored rubber composition in an alternate embodiment prior to completion of crosslinking may contain a neutralized acid group-containing rubber and a free radical generating covalent crosslinking agent.

The neutralized acid group-containing rubbers may and preferably are neutralized versions of the carboxylated and sulfonated rubbers described above. Thus, neutralized carboxylated styrene-butadiene rubber, neutralized carboxylated polybutadiene rubber, neutralized carboxylated nitrile rubber and the like may be employed. These may be prepared in known manner by neutralizing the carboxylated rubber with an appropriate base, preferably an inorganic metal salt such as zinc oxide, magnesium oxide or mixtures thereof. Neutralized sulfonated rubbers which may be employed include neutralized sulfonated styrene-butadiene and neutralized sulfonated EPDM rubber. These may be prepared in known manner by neutralizing the sulfonated rubber with an appropriate basic compound, preferably a mono-, di-, tri-, or tetravalent metal ion of a metal of Groups I, II, III, IV, V, VI-B, VII-B and VIII of the Periodic Table of the Elements in accordance with the procedure described in U.S. Pat. Nos. 3,642,728 and 3,836,511 referred to above.

The preferred rubbers employed in the colored tire stocks of the invention are blends of chlorobutyl rubber, natural rubber and EPDM. The amounts of the various rubbers utilized in the blend may be varied somewhat. Thus, the rubber blend may contain from about 45 to about 50 parts by weight of chlorobutyl rubber, from about 30 to 45 parts by weight of natural rubber and from about 10 to about 20 parts by weight of EPDM.

As indicated, the colored rubber composition prior to crosslinking contains an ionic crosslinking agent selected from the group consisting of metal salts of carboxylic acids and inorganic metal salts.

Suitable metal salts of carboxylic acids which may be employed include metal salts of acrylic acid, methacrylic acid, crotonic acid, itaconic acid and the like with the preferred metal salts being metal salts of methacrylic acid (i.e., metal methacrylates).

Metal methacrylates which may be employed include aluminum trimethacrylate, calcium dimethacrylate, magnesium dimethacrylate and zinc dimethacrylate. The preferred metal dimethacrylate is zinc dimethacrylate.

The metal methacrylate can be prepared by any known method. In general, the metal methacrylate may be prepared by reacting under agitation a metal oxide and methacrylic acid in an amount of from about 0.5 to about 0.6 moles of metal oxide per mole of methacrylic acid in a liquid medium (e.g. water or a volatile organic liquid such as a liquid hydrocarbon), recovering the resultant metal dimethacrylate product from liquid medium and then drying the product. A preferred method for preparing zinc dimethacrylate involves reacting with agitation zinc oxide and methacrylic acid in amount of from about 0.5 to about 0.6 moles of zinc oxide per mole of methacrylic acid in a liquid aliphatic hydrocarbon (preferably an alkane, especially hexane), followed by recovery of the resultant zinc dimethacrylate from the liquid medium and drying thereof as described in U.S. Pat. No. 4,500,466, the disclosure of which is incorporated herein by reference.

The amounts of metal methacrylate employed in the colored rubber composition may vary considerably depending on a number of factors including the level of ionic crosslinks desired and whether or not the metal methacrylate is to be utilized solely to introduce ionic crosslinks into the rubber or as is preferred herein as a combination ionic crosslinking agent and filler or reinforcing agent. In instances where the metal methacrylate is used as a combination ionic crosslinker and filler, it may be utilized as the sole filler or as a partial replacement for a conventional filler such as clay or silica. In general, the amounts of metal methacrylate included in the composition may range from about 5 to 70 parts by weight per 100 parts by weight of rubber or rubber blend with the higher amounts (e.g. above 40 parts) being used when the metal methacrylate is employed as the sole filler. However, the preferred amounts of metal methacrylate range from about 5 to about 50 parts by weight per 100 parts by weight of rubber with particularly preferred amounts ranging from 5 to 25 parts by weight.

Inorganic metal salts which may be employed as ionic crosslinking agents include those described above in connection with the acid-group containing rubbers. Thus, the preferred inorganic metal salts are zinc oxide, magnesium oxide and mixtures thereof. Amounts of inorganic metal salts employed are dependent upon the concentration of acid groups in the rubber, the level of ionic crosslinks desired and the like. The inorganic metal salts may generally be utilized in amounts ranging from about 1 to about 20 parts by weight per 100 parts by weight of acid-groups containing rubber with preferred amounts ranging from 2 to 10 parts by weight.

As indicated, the colored rubber composition prior to crosslinking further contains a free radical generating covalent crosslinking agent. The preferred free radical generating covalent crosslinking agents ar peroxide crosslinking agents.

Peroxide crosslinking agents which may be employed include organic peroxides such as dicumyl peroxide, bis-(t-butyl peroxy) diisopropyl benzene, t-butyl perbenzoate, di-t-butyl peroxide, 2,5-dimethyl-2, 5-di-t-butyl peroxy hexane and the like. The preferred peroxide crosslinking agents are bis-(t-butyl peroxy) diisopropyl benzene and dicumyl peroxide.

Amounts of peroxide crosslinking agents utilized in the colored rubber composition may be broadly stated as cure effective amounts. In general, such amounts may range from about 0.1 to about 5.0 parts by weight of peroxide per 100 parts by weight of rubber. Preferred amounts of peroxide may range from about 0.8 to about 1.5 parts by weight per 100 parts by weight of rubber.

As indicated heretofore, the present invention is directed to colored tire stocks other than black colored tire stocks. The colored tire stocks ma be prepared by incorporating various color pigments or dyes into the rubber composition or compound. Thus, white tire stocks such as for white sidewalls or white raised letters may be prepared by incorporating white pigments such as titanium dioxide, zinc oxide, calcium oxide and the like into the rubber compound. Other colored tire stocks may be prepared by incorporating various inorganic or organic pigments or dyes into the rubber compound. Typical of such pigments or dyes are those which are available from Harwick Chemical Corporation under the designation Stan-Tone ® MB Colors.

Illustrative examples of such pigments and dyes which may be used to prepare colored tire stocks having colors other than black or white are the following pigments or dyes which are identified by both their pigment type and Color Index designations (hereinafter C.I.) and include among others blue pigments such as Phthalocyanine NC (C.I. PB-15:1), Phthalocyanine RS (C.I. PB-15) and the like; yellow pigments such as Diarylide AAOT (C.I. PY-14), Diarylide AAA (C.I. PY-12) and the like; red pigments such as Thioindigo (C.I. PR-88), Red 2B, CA Salt (C.I. PR-48:2) and the like; green pigments such as Phthalocyanine BS (C.I. PG-7), Phthalocyanine YS (C.I. PG-7) and the like; orange pigments such as Pyrazolone (C.I. PO-13), Dianisidine (C.I. PO-16) and the like; and brown pigments such as Iron oxide, light (C.I. PB-7), Iron oxide, dark (C.I. PB-7) and the like. Illustrative examples of suitable dyes which may be employed include celliton yellow, celliton orange, golden yellow, golden orange I, celliton violet R, oil orange, para red, cellitozol ST, yellow AB, brown V, celliton fast yellow, sudan green, sudan yellow and the like. All of the specific dyes mentioned above are illustrated in the publication: The Chemistry of Synthetic Dyes and Pigments. H. A. Tubs, Reinhold, 1955. That publication as well as the Color Index lists a large number of pigments and dyes which may be utilized to prepare colored rubber compounds.

The colored rubber compound in addition to rubber, crosslinking agents and color pigments or dyes may contain other conventional additives which are commonly employed in such compounds including non-black fillers such as clays, silicas, silicates and the like; non-staining process and extender oils; processing aids such as zinc stearate, sodium dodecyl sulfate and the like; tackifying resins, plasticizers, antioxidants, antiozonants, waxes, cure accelerators, zinc oxide, stearic acid, U.V. stabilizers and the like. Such additives may be utilized in amounts conventionally employed in such compounds.

The colored rubber compounds are generally prepared by mixing the ingredients on a mill. The compound may be formed into desired dimensions by sheeting the compound off the mill, by calendering or by extrusion.

The following examples are submitted for the purpose of further illustrating the nature of the present invention and are not intended as a limitation on the scope thereof. Parts and percentages referred to in the examples and throughout the specification are by weight unless otherwise indicated.

In the examples, the amounts of ionic and covalent crosslinks introduced into the rubber were determined using the following procedure.

Samples of each stock were cured for 20 minutes at 328oF. The cured samples were then cut into strips and one-half the strips were extracted with a mixture of THF and $H_2O$ (80/20) for 21 days at 50° C. The extracted samples were then dried thoroughly in a vacuum oven at 50° C. to constant weight. (This extraction technique will remove oil, wax, and other low molecuar weight ingredients). The dried samples were then tested for stress-strain properties and crosslink density was estimated from the initial slope of the stress-strain curve.

Another one-half of the cured strips were extracted with a mixture of THF/$H_2O$/HCL (80/20/2) for 21 days at 50° C. The extracted samples were then dried thoroughly in a vacuum oven at 50° C. to constant weight. (This extraction technique will remove oil, wax, other low molecular weight ingredients and also will remove Zinc salt crosslinks (ionic crosslinks).

The dried sample was then tested for stress-strain properties and crosslink densities again estimated from the initial slope of the stress-strain curve. The crosslink density difference between the first and second extraction was taken to be the amount of ionic crosslink in the samples.

EXAMPLES 1-2

In these examples, white sidewall stocks of the invention were evaluated for appearance and abrasion resistance. For comparative purposes, a conventional white sidewall stock was included to serve as a control.

The white sidewall stocks had the following formulations:

|  | Parts by weight | | |
| --- | --- | --- | --- |
| Ex. No. | Control | 1 | 2 |
| Ingredients | | | |
| chlorobutyl rubber[1] | 50.00 | 50.00 | 50.00 |
| natural rubber | 30.00 | 30.00 | 30.00 |
| EPDM[2] | 20.00 | 20.00 | 20.00 |
| titanium dioxide | 35.00 | 20.00 | 25.00 |
| hard clay | 22.00 | 27.00 | 27.00 |
| magnesium silicate | 23.00 | 28.00 | 28.00 |
| zinc dimethacrylate | — | 11.00 | 6.00 |
| ultramarine blue | 0.60 | 0.60 | 0.60 |
| stearic acid | 1.00 | 1.00 | 1.00 |
| wax | 2.50 | 2.50 | 2.50 |
| process oil | 3.00 | 3.00 | 3.00 |
| zinc stearate | — | 2.00 | 2.00 |
| nonylphenol formaldehyde | 2.00 | — | — |
| zinc oxide | 12.00 | 5.00 | 5.00 |
| Vultac #5[3] | 1.25 | 1.25 | 1.25 |
| Vulcanox ZMB-2[4] | 1.00 | 1.00 | 1.00 |
| Vulcup 40KE[5] | — | 1.25 | 1.25 |
| sulfur | 0.50 | — | — |
| Altax[6] | 0.75 | 1.25 | 1.25 |
| Total | 204.60 | 204.85 | 204.85 |

[1] a chlorobutyl rubber having a chlorine content of from 1.1 to 1.3% and a Mooney Viscosity, ML/(1 + 8)/100°C. of from 51 to 60 available under the designation Exxon 1066 from Exxon Chemical Company.
[2] an ethylene/propylene/dicyclopentadiene terpolymer having an ethylene: propylene ratio of 68:32 containing 3% dicyclopentadiene and having a Tg of −69° C., a specific gravity of 0.865 and a Mooney Viscosity ML/4/125° C. of 42, available from Uniroyal Chemical Company.
[3] an alkyl phenol disulfide on an inert carrier available from Pennwalt Corporation.
[4] zinc-4,5-dimethylbenzimideazole
[5] bis-(t-butyl peroxy) diisopropyl benzene, 40% on a clay carrier.
[6] benzothiazyl disulfide.

The above compounds were prepared by mixing the ingredients on a mill using conventional mill mixing procedures. Differences in color between the control and experimental compound were determined by sheeting out samples of each compound, curing the sheeted compounds for 20 minutes at 320° F. and then visually observing the color of each compound. Abrasion resistance of each compound was determined by curing samples of the compounds for 25 minutes at 320° F. and then conducting a Pico abrasion resistance test using a Pico abrader employing the procedure set forth in ASTM D2228-83. Test results are shown in Table I.

TABLE I

| Ex. No. | Control | 1 | 2 |
|---|---|---|---|
| Crosslinks, % | | | |
| ionic | — | 17 | 14 |
| covalent | 100 | 83 | 86 |
| Visual appearance | par | whiter color | whiter color |
| Pico Abrasion | | | |
| Volume loss | 0.0395 | 0.0220 | 0.0200 |
| Pico Rating | 100 | 175 | 193 |

The above compounds were evaluated for color stability to ultraviolet light using the following procedure:

6"×6"×0.100" plaques were first prepared by laminating 6"×6"×0.050" sheets of the white sidewall to be tested to 6"×6"×0.050" sheets of black sidewall stock made up of three segments: i.e., ⅓ staining black sidewall, ⅓ non-staining black sidewall and ⅓ staining black sidewall. A total of four plaques were prepared with two of the plaques containing a top layer or sheet of control white sidewall and two of the plaques containing a top layer of the white sidewall stock of Example 1. The plaques were each cured for 20 minutes at 320° F. Then, the plaques were cut into 1"×6" strips in such a manner that the top sheet of white sidewall stock was in contact with a bottom sheet of black sidewall stock containing all three segments (i.e., staining, non-staining and staining black sidewall). The test strips were then placed under an ultraviolet lamp on a turntable with air blowing over the strips. Part of each strip was covered and the other part exposed to the light.

After 22 hours of exposure to ultraviolet light, the test strips were visually examined for discoloration. The test strip containing the control white sidewall stock had severe discoloration in the area above the staining black sidewall stock and was slightly yellow in the area above the non-staining black sidewall stock. The test strip containing the white sidewall stock of Example 1 had only slight discoloration in the area above the staining black sidewall stock and no discoloration in the area above the non-staining black sidewall stock.

Exposure of the test strips to ultraviolet light was continued for an additional 120.5 hours or for a total of 142.5 hours. An examination of the test strip containing the control white sidewall stock revealed that the area of white sidewall over the staining black sidewall stock had a brownish color and the area over the non-staining black sidewall stock exhibited a definite yellow color. In contrast, an examination of the test strip containing the white sidewall stock of Example 1 revealed that the area of white sidewall over the staining black sidewall stock had a light tan color and the area over the non-staining black sidewall stock had only a very, very slight or faint hint of yellowish color.

The control white sidewall stock and the white sidewall stock of Example 1 were also evaluated for curb scuffing resistance. This was done by preparing P195/75R14 size steel belted radial white sidewall tires and then subjecting the tires to a curb scuffing test.

The curb scuffing test was conducted in accordance with the following procedure:

Each test tire was mounted on a 14×5.5 inch rim, inflated to 30 psi and applied to the right front position of a Chevrolet Celebrity automobile. The right front tire of the auto was kept in constant contact with a curb while driving at relatively slow speeds (i.e. 10–15 mph) so that the white sidewall remained in contact with the curb surface. During the test, the white sidewall area of the tire is visually observed and a running count of the number of tire revolutions is kept. A tire is considered to have passed the test if the white sidewall area shows only minor abrasion after contacting the curb surface for fifty (50) tire revolutions. The results of the curb scuffing test were as follows:

(a) Tire with Control White Sidewall Stock

At 30 tire revolutions, the outside edge of the white sidewall began to show abrasion. At 50 revolutions, there was severe abrasion of the outside edge of the white sidewall with some areas worn through to the black stock under the white sidewall. This tire does not pass this curb scuffing test.

(b) Tire with Experimental White Sidewall Stock of Example 1

At 30 revolutions, the tire had a good appearance and there was little or no evidence of abrasion of the white sidewall. After 50 revolutions, there was only a very slight abrasion to the outer edge of the white sidewall. Thus, this tire with the experimental white sidewall passes the curb scuffing test.

As is clearly evident from this test, the experimental white sidewall of the invention has much improved abrasion resistance compared to the control white sidewall and the test results are in good agreement with the laboratory Pico abrasion test results.

EXAMPLES 3–6

These examples illustrate additional white sidewall stocks of the invention. For comparative purposes, a conventional white sidewall stock was included to serve as a control.

The white sidewall stocks had the following formulations:

| Ex. No. | Control | 3 | 4 | 5 | 6 |
|---|---|---|---|---|---|
| Ingredients | | | | | |
| chlorobutyl rubber | 50.00 | 50.00 | 50.00 | 50.00 | 50.00 |
| natural rubber | 30.00 | 30.00 | 30.00 | 30.00 | 30.00 |
| EPDM rubber | 20.00 | 20.00 | 20.00 | 20.00 | 20.00 |
| Titanium dioxide | 35.00 | 35.00 | 35.00 | 35.00 | 35.00 |
| hard clay | 22.00 | 22.00 | — | — | — |
| magnesium silicate | 23.00 | — | 22.00 | — | — |
| zinc dimethacrylate | — | 23.00 | 23.00 | 45.00 | 30.00 |
| ultramarine blue | 0.60 | 0.60 | 0.60 | 0.60 | 0.60 |
| stearic acid | 1.00 | 1.00 | 1.00 | 1.00 | 1.00 |
| wax | 2.50 | 2.50 | 2.50 | 2.50 | 2.50 |
| oil | 3.00 | 3.00 | 3.00 | 3.00 | 3.00 |
| nonylphenol formaldehyde | 2.00 | — | — | — | — |
| zinc stearate | — | 2.00 | 2.00 | 2.00 | 2.00 |
| zinc oxide | 12.00 | 5.00 | 5.00 | 5.00 | 5.00 |
| Vultac #5 | 1.25 | 1.25 | 1.25 | 1.25 | 1.25 |
| Vulcup 40KE (peroxide) | — | 1.25 | 1.25 | 0.80 | 1.25 |
| Vulcanox ZMB-2 | 1.00 | 1.00 | 1.00 | 1.00 | 1.00 |
| Altax | 0.75 | — | — | — | — |
| sulfur | 0.50 | — | — | — | — |

-continued

| Ex. No. | Control | 3 | 4 | 5 | 6 |
|---|---|---|---|---|---|
| Total | 204.60 | 197.60 | 197.60 | 197.15 | 182.60 |

The above compounds were mixed using the procedure of Example 1, tested for Mooney Viscosity (ML/4/100° C.) and then cured and tested for various properties including stress-strain and abrasion resistance. Test conditions and results are shown in Table II.

TABLE II

| Ex. No. | Control | 3 | 4 | 5 | 6 |
|---|---|---|---|---|---|
| Crosslinks, % | | | | | |
| ionic | — | *ND | ND | ND | ND |
| covalent | 100 | *ND | ND | ND | ND |
| ML/4/100° C. | 40.2 | 38.6 | 38.1 | 33.8 | 34.4 |
| Stress-Strain, R.T. (cure: 20′ at 328° F.) | | | | | |
| 50% modulus, psi | 230 | 260 | 300 | 265 | 206 |
| 100% modulus, psi | 395 | 560 | 635 | 535 | 435 |
| 200% modulus, psi | 660 | 1175 | 1150 | 1095 | 925 |
| 300% modulus, psi | 885 | 1650 | 1485 | 1550 | 1355 |
| tensile, psi | 1220 | 1690 | 1485 | 1570 | 1620 |
| elongation at break, % | 420 | 310 | 300 | 300 | 370 |
| Pico Abrasion (cure: 25′ at 320° F.) | | | | | |
| weight loss | 0.0650 | 0.0396 | 0.0399 | 0.0475 | 0.0503 |
| volume loss | 0.0480 | 0.031 | 0.031 | 0.039 | 0.042 |
| Pico rating | 100 | 154 | 154 | 123 | 114 |

*Contains both ionic and covalent crosslinks - specific values not determined

EXAMPLE 7-8

These examples further illustrate white sidewall stocks of the invention containing zinc dimethacrylate as the sole filler. The white sidewall stocks had the following formulations:

| | parts by weight | |
|---|---|---|
| Ex. No. | 7 | 8 |
| Ingredients | | |
| chlorobutyl rubber* | 45.00 | 50.00 |
| natural rubber | 45.00 | 30.00 |
| EPDM rubber | 10.00 | 20.00 |
| titanium dioxide | 35.00 | 35.00 |
| zinc dimethacrylate | 50.00 | 30.00 |
| zinc oxide | 5.00 | 5.00 |
| oil | 4.50 | 4.50 |
| wax | 1.00 | 1.00 |
| sodium dodecyl sulfate | 2.00 | 2.00 |
| ultramarine blue | 0.60 | 0.60 |
| Vulcup 40KE | 1.25 | 0.80 |
| Vultac #5 | 1.25 | 1.25 |
| Total | 200.60 | 180.15 |

*Chlorobutyl rubber having a chlorine content of from 1.1 to 1.3% and a Mooney Viscosity, ML/(1 + 8)/127° C., of from 50 to 60 available under the designation Exxon 1068 from Exxon Chemical Company.

The above compounds were mixed using the procedure of Example 1, cured and tested for percent ionic and covalent crosslings, ring tear and Pico Abrasion resistance. For comparative purposes, samples of the control white sidewall stock above were also cured and tested for the same properties. Test conditions and test results are shown in Table III.

TABLE III

| Ex. No. | Control | 7 | 8 |
|---|---|---|---|
| Crosslinks, % | | | |
| ionic | — | 84 | 61 |

TABLE III-continued

| Ex. No. | Control | 7 | 8 |
|---|---|---|---|
| covalent | 100 | 16 | 39 |
| Ring Tear (cure: 10′ @ 328° F.) | | | |
| 100° C. | 61 | 52 | 53 |
| 150° C. | 36 | 39 | 36 |
| Pico Abrasion (cure: 25′ @ 320° F.) | | | |
| volume loss | 0.074 | 0.032 | 0.047 |
| Pico rating | 100 | 231 | 157 |

We claim:

1. A colored tire stock, other than black colored, having improved abrasion resistance, color and color stability comprising a crosslinked colored rubber composition containing from 10 to 90% of ionic crosslinks and from 90 to 10% of free radical induced covalent crosslinks.

2. The colored tire stock of claim 1 wherein said colored rubber composition prior to crosslinking comprises a rubber which is capable of undergoing ionic and covalent crosslinking; an ionic crosslinking agent selected from the group consisting of metal salts of carboxylic acids and inorganic metal salts and a free radical generating covalent crosslinking agent.

3. The colored tire stock of claim 2 wherein said rubber is selected from the group consisting of saturated rubbers, unsaturated rubbers, acid group-containing rubbers and blends thereof.

4. The colored tire stock of claim 3 wherein said saturated rubbers are selected from the group consisting of hydrogenated styrene-butadiene rubbers, hydrogenated polybutadiene rubbers, butyl rubbers and halogenated butyl rubbers.

5. The colored tire stock of claim 3 wherein said unsaturated rubbers are selected from the group consisting of natural rubber, styrene-butadiene rubber, polybutadiene rubber, ethylene/propylene/diene monomer terpolymer rubber and blends thereof.

6. The colored tire stock of claim 3 wherein said acid group-containing rubbers are selected from the group consisting of carboxylated rubbers and sulfonated rubbers.

7. The colored tire stock of claim 6 wherein said carboxylated rubbers are selected from the group consisting of carboxylated styrene-butadiene rubber, carboxylated polybutadiene rubber and carboxylated nitrile rubber.

8. The colored tire stock of claim 6 wherein said sulfonated rubbers are selected from the group consisting of sulfonated styrene-butadiene rubber and sulfonated ethylene/propylene/ diene monomer terpolymer rubber.

9. The colored tire stock of claim 2 wherein said ionic crosslinking agent is a metal salt of a carboxylic acid.

10. The colored tire stock of claim 9 wherein said ionic crosslinking agent is a metal methacrylate.

11. The colored tire stock of claim 10 wherein said metal methacrylate is selected from the group consisting of aluminum trimethacrylate, calcium dimethacrylate, magnesium dimethacrylate and zinc dimethacrylate.

12. The colored tire stock of claim 2 wherein said ionic crosslinking agent is an inorganic metal salt.

13. The colored tire stock of claim 12 wherein said inorganic metal salt is a metal oxide.

14. The colored tire stock of claim 13 wherein said metal oxide is selected from the group consisting of zinc oxide, magnesium oxide and mixtures thereof.

15. The colored tire stock of claim 2 wherein said free radical generating covalent crosslinking agent is a peroxide crosslinking agent.

16. The colored tire stock of claim 15 wherein said peroxide crosslinking agent is bis-(t-butyl peroxy) diisopropyl benzene.

17. The colored tire stock of claim 1 wherein said colored tire stock is a colored sidewall tire stock.

18. The colored tire stock of claim 17 wherein said colored sidewall tire stock is a white sidewall tire stock.

19. The colored tire stock of claim 2 wherein said colored rubber composition is a white sidewall rubber composition.

* * * * *

UNITED STATES PATENT AND TRADEMARK OFFICE
CERTIFICATE OF CORRECTION

PATENT NO. : 4,987,192
DATED : January 22, 1991
INVENTOR(S) : Arthur E. Oberster, et al.

It is certified that error appears in the above-identified patent and that said Letters Patent is hereby corrected as shown below:

The cover page of patent no. 4,987,192 does not reflect the following:

"[73] Assignee: Bridgestone/Firestone, Inc., Akron, Ohio"

and

"Attorney, Agent, or Firm - Frank J. Troy, Sr."

Please add the above information.

Signed and Sealed this

Twenty-fifth Day of May, 1993

Attest:

MICHAEL K. KIRK

*Attesting Officer*   *Acting Commissioner of Patents and Trademarks*